United States Patent
Fan et al.

(10) Patent No.: US 11,429,594 B2
(45) Date of Patent: Aug. 30, 2022

(54) SYNCHRONIZATION BETWEEN PRIMARY DATABASE AND SECONDARY DATABASE

(71) Applicant: Alibaba Group Holding Limited, Grand Cayman (KY)

(72) Inventors: Xiaojian Fan, Hangzhou (CN); Guangzhou Zhang, Beijing (CN); Wenjie Zhang, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 179 days.

(21) Appl. No.: 16/805,083

(22) Filed: Feb. 28, 2020

(65) Prior Publication Data

US 2020/0201845 A1 Jun. 25, 2020

Related U.S. Application Data

(63) Continuation of application No. PCT/CN2018/101262, filed on Aug. 20, 2018.

(30) Foreign Application Priority Data

Aug. 29, 2017 (CN) .......................... 201710758538.2

(51) Int. Cl.
 *G06F 16/23* (2019.01)
(52) U.S. Cl.
 CPC ...... *G06F 16/2379* (2019.01); *G06F 16/2358* (2019.01)
(58) Field of Classification Search
 CPC .................. G06F 16/2379; G06F 16/2358
 See application file for complete search history.

(56) References Cited

U.S. PATENT DOCUMENTS

| 6,332,198 | B1 | 12/2001 | Simons et al. |
| 6,377,959 | B1 * | 4/2002 | Carlson ............... G06F 11/141 |
| 6,421,688 | B1 | 7/2002 | Song |
| 7,039,827 | B2 | 5/2006 | Meyer et al. |
| 7,062,642 | B1 | 6/2006 | Langrind et al. |
| 7,103,619 | B1 | 9/2006 | Rajpurkar et al. |
| 7,480,827 | B2 | 1/2009 | Callaway et al. |
| 7,668,879 | B2 | 2/2010 | Vivian et al. |
| 7,890,461 | B2 | 2/2011 | Oeda et al. |

(Continued)

FOREIGN PATENT DOCUMENTS

| CN | 105159795 A | 12/2015 | |
| CN | 106897288 A * | 6/2017 | ............... H04L 1/22 |
| CN | 106897288 A | 6/2017 | |

OTHER PUBLICATIONS

The Extended European Search Report dated Dec. 21, 2020 for European Patent Application No. 18851867.4, 9 pages.

(Continued)

*Primary Examiner* — William B Partridge
*Assistant Examiner* — Lahcen Ennaji
(74) *Attorney, Agent, or Firm* — Lee & Hayes, P.C.

(57) ABSTRACT

A method including acquiring, by a primary database, in response to a transaction commit request, a log difference between a transaction log of the primary database and a transaction log that has been synchronized to a secondary database; suspending a transaction commit operation if the log difference is greater than a first threshold; and executing the transaction commit operations if the log difference is less than or equal to the first threshold.

20 Claims, 7 Drawing Sheets

(56) References Cited

U.S. PATENT DOCUMENTS

| | | | |
|---|---|---|---|
| 8,117,154 | B2 | 2/2012 | Holenstein et al. |
| 8,423,515 | B2 | 4/2013 | Vivian et al. |
| 8,510,267 | B2 | 8/2013 | Barton et al. |
| 9,336,226 | B2 | 5/2016 | Vibhor et al. |
| 9,495,435 | B2 | 11/2016 | Zhang et al. |
| 2002/0178177 | A1 | 11/2002 | Park et al. |
| 2005/0071384 | A1* | 3/2005 | Cotner ............... G06F 11/1471 |
| 2007/0088707 | A1* | 4/2007 | Durgin ............... G06F 16/275 |
| 2007/0276782 | A1* | 11/2007 | Oshiro ............... G06F 16/284 |
| 2008/0082555 | A1 | 4/2008 | Salmon et al. |
| 2012/0166407 | A1 | 6/2012 | Lee et al. |
| 2012/0311273 | A1 | 12/2012 | Marathe et al. |
| 2018/0081548 | A1* | 3/2018 | Barzik ............... G06F 3/067 |

OTHER PUBLICATIONS

Translation of Written Opinion for corresponding PCT Application PCT/CN2018/101262, dated Mar. 7, 2019, a counterpart foreign application for U.S. Appl. No. 16/805,083, 4 pages.

Translation of Search Report for corresponding PCT Application PCT/CN2018/101262, dated Mar. 7, 2019, a counterpart foreign application for U.S. Appl. No. 16/805,083, 2 pages.

\* cited by examiner

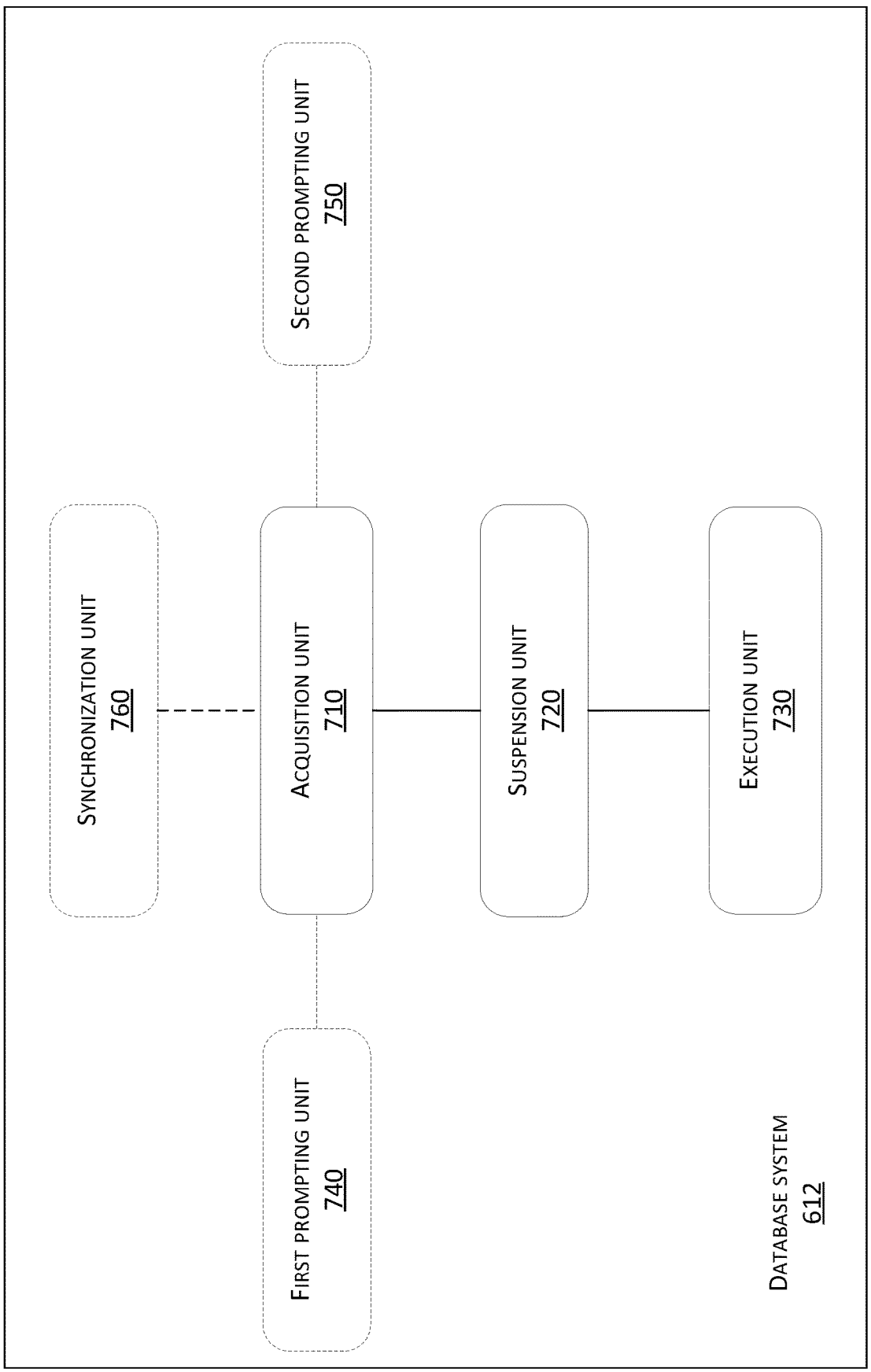

SYNCHRONIZATION BETWEEN PRIMARY DATABASE AND SECONDARY DATABASE

CROSS REFERENCE TO RELATED APPLICATIONS

This application claims priority to and is a continuation of PCT Patent Application No. PCT/CN2018/101262, filed on 20 Aug. 2018 and entitled "METHOD FOR SYNCHRONIZATION BETWEEN PRIMARY DATABASE AND STANDBY DATABASE, DATABASE SYSTEM, AND DEVICE," which claims priority to Chinese Patent Application No. 201710758538.2, filed on 29 Aug. 2017 and entitled "METHOD FOR SYNCHRONIZATION BETWEEN PRIMARY DATABASE AND STANDBY DATABASE, DATABASE SYSTEM, AND DEVICE," which are incorporated herein by reference in their entirety.

TECHNICAL FIELD

The present disclosure relates to the field of databases, and, more particularly, to methods, database systems, and devices for synchronization method between a primary database and a secondary database.

BACKGROUND

In a database system, when a primary database is down due to abnormalities and cannot provide external services, switching to a secondary database becomes necessary to continue to provide service. Data synchronization modes between the primary database and the secondary database mainly comprise a synchronous mode and an asynchronous mode. There are shortcomings in both modes. In the synchronization mode, logs of data changes in the primary database must be synchronized to the secondary database for it to continue providing services. When there is network jitter or a network latency between the primary database and the secondary database or the secondary database is stuck temporarily, the response of the database is seriously affected. In the asynchronous mode, the logs of the data changes in the primary database do not need to wait for synchronization to the secondary database. The disadvantage is that once the primary database becomes unavailable, a large amount of data is lost when it switches to the secondary database.

In an existing primary database and secondary database synchronization solution, the synchronous mode is adopted between the primary database and the secondary database under normal conditions. Once the secondary database fails to respond for a certain period of time, the asynchronous mode is adopted between the primary database and the secondary database. However, once the asynchronous mode is adopted, a large amount of data is still lost after switching to the secondary database when the primary database becomes unavailable.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Example embodiments of the present disclosure provide a method, database system, and device for synchronization between a primary database and a secondary database, which avoid losing a large amount of data when the primary database is unavailable while keeping the database responsive.

An example embodiment of the present disclosure provides a synchronization method between a primary database and a secondary database, which comprises:

acquiring, in response to a transaction commit request, a log difference between a transaction log of a primary database and a transaction log that has been synchronized to a secondary database;

suspending transaction commit operations if the log difference is greater than a first threshold; and executing the transaction commit operations if the log difference is less than or equal to the first threshold.

An example embodiment of the present disclosure provides a database system, which comprises:

an acquisition unit, configured to acquire, in response to a transaction commit request, a log difference between a transaction log of the database system and a transaction log that has been synchronized to a secondary database;

a suspension unit configured to suspend transaction commit operations if the log difference is greater than a first threshold; and an execution unit configured to execute the transaction commit operations if the log difference is less than or equal to the first threshold.

An example embodiment of the present disclosure provides an electronic device, which comprises:

one or more processors; and one or more memories storing computer readable instructions that, executable by the processor, cause the processor to perform acts comprising:

acquiring, in response to a transaction commit request, a log difference between a transaction log of a primary database and a transaction log that has been synchronized to a secondary database in the electronic device;

suspending transaction commit operations if the log difference is greater than a first threshold; and executing the transaction commit operations if the log difference is less than or equal to the first threshold.

An example embodiment of the present disclosure provides a computer readable storage medium storing one or more programs that, executable by an electronic device including a plurality of applications, cause the electronic device to perform acts comprising:

acquiring, in response to a transaction commit request, a log difference between a transaction log of a primary database and a transaction log that has been synchronized to a secondary database in the electronic device;

suspending transaction commit operations if the log difference is greater than a first threshold; and executing the transaction commit operations if the log difference is less than or equal to the first threshold.

Based on the technical solution above, the primary database in the example embodiments of the present disclosure determines, in response to the transaction commit request, whether to suspend the transaction commit operations or execute the transaction commit operations according to the log difference between the primary database and the secondary database. The techniques of the present disclosure ensure that the database may stay responsive while avoiding the loss of a large amount of data when the primary database is unavailable, thereby improving the performance of the database system.

BRIEF DESCRIPTION OF DRAWINGS

To describe the technical solutions in the example embodiments of the present disclosure, the following briefly describes the accompanying drawings which aide in exemplifying the example embodiments. Apparently, the accompanying drawings in the following description only show some example embodiments of the present disclosure, and a person of ordinary skill in the art may still derive other accompanying drawings from these accompanying drawings without creative efforts.

FIG. 7 is a schematic structural diagram of a database system according to an example embodiment of the present disclosure.

DESCRIPTION OF EXAMPLE EMBODIMENTS

In order to enable a person skilled in the art to better understand the technical solutions in the present disclosure, the following clearly and completely describes the technical solutions in the example embodiments of the present disclosure with reference to the accompanying drawings in the example embodiments of the present disclosure. Apparently, the described example embodiments merely represent some rather than all of the embodiments of the present disclosure. All other example embodiments obtained by a person of ordinary skill in the art based on the example embodiments of the present disclosure without creative efforts shall fall within the protection scope of the present disclosure.

In a database system, log writing and data file writing are two operations that consume the most IO in a database. In these two operations, data file writing is scattered while log writing is sequential. Therefore, in order to ensure the performance of the database, the database usually needs to ensure that logs are written into log files before the commit is completed, while dirty data blocks are stored in a buffer cache and then irregularly written into the data files in batches. In other words, log writing and commit operations are synchronous, while data writing and commit operations are asynchronous.

Figure 1:
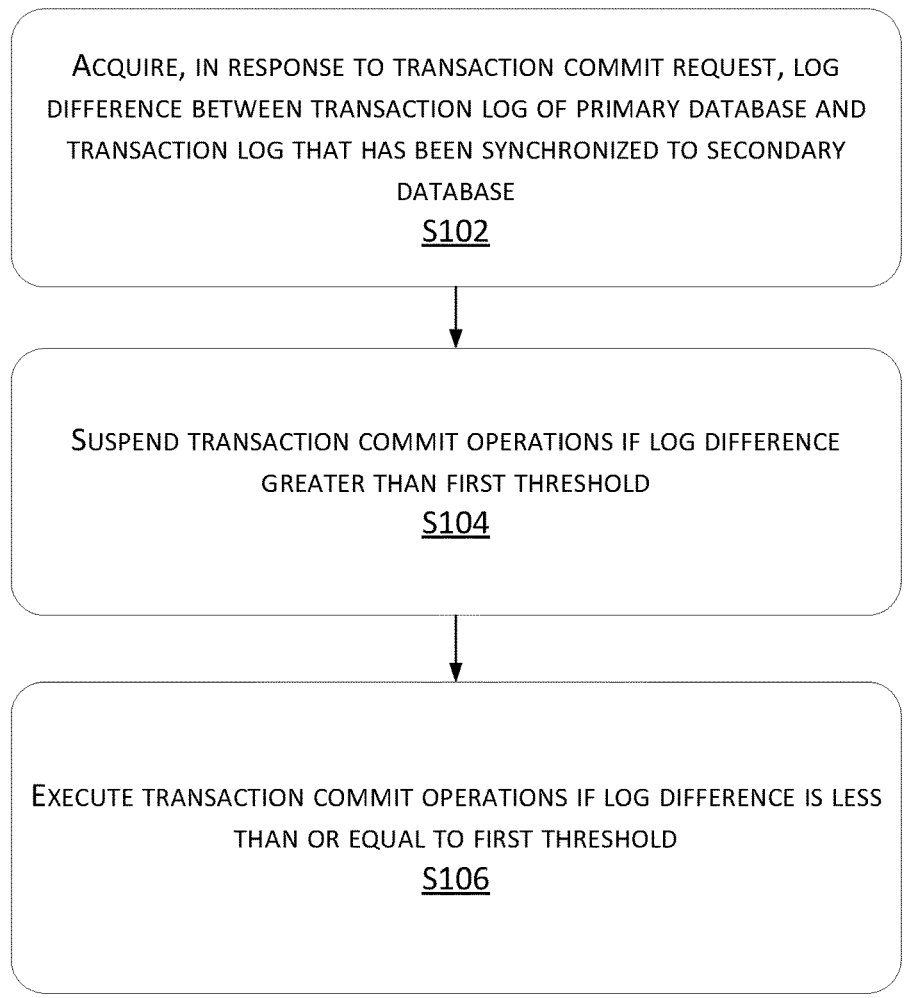
FIG. 1 is a flowchart of a synchronization method between a primary database and a secondary database according to an example embodiment of the present disclosure.

FIG. 1 is a flowchart of a synchronization method between a primary database and a secondary database according to an example embodiment of the present disclosure. The method in FIG. 1 is implemented by the primary database. In the example embodiment of the present disclosure, transaction logs of the primary database are synchronized to the secondary database so that operations of the primary database are restored in the secondary database by using the transaction logs, thereby achieving synchronization between the primary database and the secondary database. The method in FIG. 1 comprises the following steps.

S102: Acquire, in response to a transaction commit request, a log difference between a transaction log of a primary database and a transaction log that has been synchronized to a secondary database.

A database transaction refers to a series of operations executed as a single logical working unit in a database. The series of operations are consistent; either all or none of the series of operations are implemented.

In the example embodiment of the present disclosure, the transaction log is a log generated after the database transaction is executed.

S104: Suspend transaction commit operations if the log difference is greater than a first threshold.

It should be understood that in the example embodiment of the present disclosure, the primary database may suspend the transaction commit operations until the log difference is less than or equal to the first predetermined threshold.

For example, in an example embodiment, the transaction commit operations comprise transaction commit operations that have begun to be executed and transaction commit operations that are ready to be executed in the primary database. In this case, the suspending transaction commit operations comprises suspending the transaction commit operations that have begun to be executed and the transaction commit operations that are ready to be executed in the primary database, namely, all transaction commit operations in the primary database. In the example embodiment of the present disclosure, the increase of transaction logs may be prevented by suspending all the transaction commit operations.

For example, in an example embodiment, the transaction commit operations comprise transaction commit operations corresponding to the transaction commit request. In this case, the suspending transaction commit operations comprises suspending the transaction commit operations corresponding to the transaction commit request. In the example embodiment of the present disclosure, by suspending the transaction commit operations corresponding to the transaction commit request, the increase of transaction logs may be prevented to a certain extent, and the impact on other transaction commit operations of the primary database may be avoided.

S106: Execute the transaction commit operations if the log difference is less than or equal to the first threshold.

It should be understood that in the example embodiment of the present disclosure, the transaction logs of the primary database are synchronized to the database, and the synchronization operation and the transaction commit operations do not interfere with each other.

It should be understood that when the transaction commit operations are suspended, the transaction logs are continuously synchronized to the secondary database, and the log difference between the primary database and the secondary database is also decreasing. When the log difference is less than or equal to the first threshold, the executing the transaction commit operations comprises: executing suspended transaction commit operations. In particular, if the suspended transaction commit operations comprise only the transaction commit operations corresponding to the transaction commit request, the executing the transaction commit operations comprises executing the transaction commit operations corresponding to the transaction commit request. Certainly, it should be understood that in the example embodiment of the present disclosure, if the log difference is always less than or equal to the first threshold, there is no suspended transaction commit operation, and the transaction commit operations corresponding to the transaction commit request are directly executed.

In the example embodiment of the present disclosure, the primary database determines, in response to the transaction commit request, whether to suspend the transaction commit operations or execute the transaction commit operations according to the log difference between the primary database and the secondary database, so that the database may stay responsive and the loss of a large amount of data may be prevented when the primary database is unavailable, improving the performance of the database system to a certain extent.

Certainly, it should be understood that the method in the example embodiment of the present disclosure may also be referred to as a method for executing transaction commit operations by the primary database.

For example, in an example embodiment, the method further comprises writing transaction logs for executing the transaction commit operations into the transaction logs of the primary database.

For example, in an example embodiment, step S102 is implemented as follows: acquiring a latest written log point in the primary database; acquiring a latest sent log point in the primary database; and determining the log difference based on the latest log point and the sent log point.

It should be understood that in the database, the log point may be used to describe a location of a log corresponding to a certain point in time. In general, a checkpoint table in the database may be used to record log point information.

In the example embodiment of the present disclosure, the log difference between the primary database and the secondary database is determined according to the latest sent log point in the primary database and the latest written log point in the primary database, so that the log difference between the primary database and the secondary database may be accurately obtained.

Further, the primary database records the point of sent logs transmitted to the secondary database.

For example, the method may further comprise when the log difference is greater than a second threshold, sending first prompt information to an administrator. The first prompt information is used to remind the administrator.

It should be understood that the prompt information may be used to remind the administrator of a current status of data synchronization so that the administrator may perform corresponding operations, such as checking the secondary database and restarting the secondary database.

Further, the first threshold is the same as the second threshold.

Alternately, further, the first threshold is different from the second threshold. It should be understood that the second threshold may be less than or greater than the first threshold.

For example, the method may further comprise: monitoring, within a predetermined time, a growth rate of the log difference between the transaction logs of the primary database and the transaction logs that have been synchronized to the secondary database; and if the growth rate is greater than a third threshold, sending second prompt information to the administrator.

For example, in an example embodiment, the transaction logs of the primary database are synchronized to the secondary database by the primary database. It should be understood that in the example embodiment of the present disclosure, the operation of synchronizing the transaction logs of the primary database to the secondary database may be executed by an independent synchronization thread or synchronization module and does not depend on transaction commit operations.

For example, in another example embodiment, the transaction logs of the primary database are synchronized to the secondary database by a third-party apparatus.

For example, in another example embodiment, the transaction logs of the primary database are actively synchronized to the secondary database by the secondary database.

The method in the example embodiment of the present disclosure is further described with reference to example embodiments.

Figure 2:
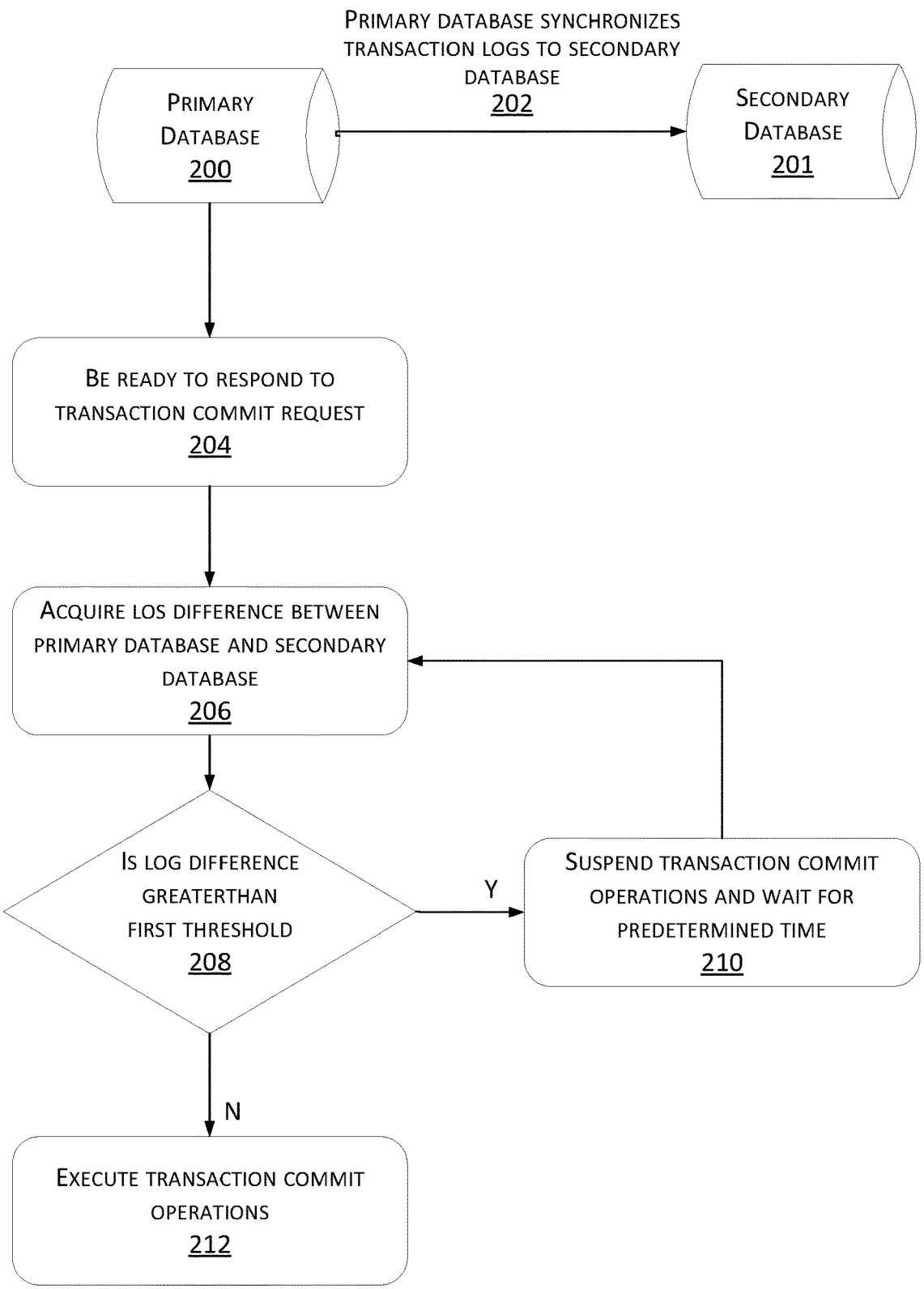
FIG. 2 is a flowchart of synchronization between a primary database and a secondary database according to an example embodiment of the present disclosure.

FIG. 2 is a flowchart of synchronization between a primary database 200 and a secondary database 201 according to an example embodiment of the present disclosure. In the scenario shown in FIG. 2, the primary database 200 synchronizes transaction logs to the secondary database 201 by using a synchronization module and commits a transaction by using a transaction commit module. There is no direct coupling relationship between the synchronization module and the transaction commit module. Certainly, it should be understood that the functional modules of the primary database 200 shown in FIG. 2 are only examples and may be implemented in different ways in actual applications. The method in FIG. 2 may comprise the following steps.

202: A primary database 200 synchronizes transaction logs to a secondary database 201.

It should be understood that in the example embodiment of the present disclosure, the process of synchronizing the transaction logs to the secondary database 201 by the primary database 200 is a continuous process. The primary database 200 may synchronize data regularly or continuously, and the example embodiment of the present disclosure is not subjected to restriction herein.

For example, the primary database 200 may synchronize the transaction logs of the primary database 200 to the secondary database 201 by using a synchronization module, such as an independent synchronization thread.

In addition, in the process of synchronizing the transaction logs to the secondary database 201 by the primary database 200, the primary database 200 records a point of sent logs transmitted to the secondary database 201.

204: The primary database 200 is ready to respond to a transaction commit request.

It should be understood that the primary database 200 may control the response to the transaction commit request by using a transaction commit module.

In the example embodiment of the present disclosure, when the primary database 200 is ready to respond to the transaction commit request, it is necessary to obtain a log difference between the primary database 200 and the secondary database 201, which means step 206 is executed.

206: The primary database 200 acquires the log difference between the primary database 200 and the secondary database 201.

For example, the primary database 200 may acquire a latest written log point in the primary database 200 and a latest sent log point in the primary database 200 and determine the log difference based on the latest log point and the sent log point.

For example, the log difference may be represented in many forms.

For example, the log difference may be the number of bytes of difference logs between the primary database 200 and the secondary database 201. The difference logs between the primary database 200 and the secondary database 201 are transaction logs that the primary database 200 has more than the secondary database 201. For example, assuming that the latest written log point in the primary database 200 is A and the latest sent log point in the primary database 200 is B, the primary database 200 may determine the total number of bytes of transaction logs between the sent log point B and the written log point A based on the sent log point B and the written log point A. The total number of bytes is the log difference between the primary database 200 and the secondary database 201.

For example, the log difference may be the number of log lines of difference logs between the primary database 200 and the secondary database 201, namely, the number of lines of transaction logs that the primary database 200 has more than the secondary database 201. For example, assuming that the latest written log point in the primary database 200 is A and the latest sent log point in the primary database 200 is B, and assuming that the data line number corresponding to the written log point A is row1 and the data line number corresponding to the sent log point B is row2, it may be determined that the number of lines of transaction logs between the sent log point B and the written log point A is row2-row1, which is the log difference between the primary database 200 and the secondary database 201.

For example, the log difference may be the number of data blocks of difference logs between the primary database 200 and the secondary database 201, namely, the number of data blocks of transaction logs that the primary database 200 has more than the secondary database 201. For example, assuming that the latest written log point in the primary database 200 is A and the latest sent log point in the primary database 200 is B, and assuming that a Log Sequence Number (LSN) corresponding to the written log point A is LSN1 and an LSN corresponding to the sent log point B is LSN2, it may be determined that a difference between data blocks of transaction logs between the sent log point B and the written log point A is LSN2-LSN1, and the data block number LSN2-LSN1 is the log difference between the primary database 200 and the secondary database 201.

Certainly, it should be understood that the log difference between the primary database 200 and the secondary database 201 may also be expressed in other units of measurement, and the example embodiment of the present disclosure is not subjected to restriction herein.

208: The primary database 200 determines whether the log difference is greater than a first threshold.

After obtaining the log difference between the primary database 200 and the secondary database 201, the primary database 200 may determine whether the log difference between the primary database 200 and the secondary database 201 is greater than the first threshold.

If the log difference between the primary database 200 and the secondary database 201 is greater than the first threshold, step 210 is executed; or if the log difference between the primary database 200 and the secondary database 201 is less than or equal to the first threshold, step 212 is executed.

Taking the number of bytes of difference logs between the primary database 200 and the secondary database 201 as an example, it may be assumed that the first threshold is 10 M. If the current log difference between the primary database 200 and the secondary database 201 is less than or equal to 10 M, for example, 5 M or 8 M, step 212 may be directly executed when the primary database 200 is ready to respond to the transaction commit request; or if the current log difference between the primary database 200 and the secondary database 201 is greater than 10 M, for example, 11 M, when the primary database 200 is ready to respond to the transaction commit request, step 210 needs to be executed to suspend transaction commit operations and wait for a synchronization process or the synchronization module to execute a log synchronization operation.

Taking the number of data blocks of difference logs between the primary database 200 and the secondary database 201 as an example, it may be assumed that the first threshold is 100 data blocks. Assuming that an LSN identifier of a point of the latest log that has been backed up to the secondary database 201 is 100001, and if an LSN identifier corresponding to a point of the latest written transaction log of the primary database 200 is less than or equal to 100101, step 212 may be directly executed when the primary database 200 is ready to respond to the transaction commit request; or if an LSN identifier corresponding to a point of the latest written transaction log of the primary database 200 is greater than 100101, when the primary database 200 is ready to respond to the transaction commit request, step 210 needs to be executed to suspend transaction commit operations and wait for a synchronization process or the synchronization module to execute a log synchronization operation.

210: Suspend transaction commit operations and wait for a predetermined time.

It should be understood that as described in step 202, the transaction logs of the primary database 200 may be continuously synchronized to the secondary database 201.

If the log difference between the primary database 200 and the secondary database 201 is greater than the first threshold, the primary database 200 may suspend the transaction commit operations.

It should be understood that in the example embodiment of the present disclosure, the primary database 200 may suspend the transaction commit operations until the log difference between the primary database 200 and the secondary database 201 is less than or equal to the first threshold.

For example, the primary database 200 may execute step 206 after waiting for the predetermined time. It should be understood that the primary database 200 may set the predetermined time. Each time the primary database 200 waits for the predetermined time, the log difference between the primary database 200 and the secondary database 201 may be obtained through step 206. The log difference and the first threshold are compared through step 208 to determine whether to continue the suspension of the transaction commit operations.

It should be understood that in the example embodiment of the present disclosure, the primary database 200 may suspend transaction commit operations that have begun to be executed and transaction commit operations that are ready to be executed in the primary database 200, or may only suspend the transaction commit operations corresponding to the transaction commit request.

212: Execute transaction commit operations.

It should be understood that if the log difference changes from being greater than the first threshold to being less than or equal to the first threshold, obviously step 210 is executed. In this case, the executing transaction commit operations comprises executing suspended transaction commit operations. In particular, if the suspended transaction commit operations only comprise the transaction commit operations corresponding to the transaction commit request of step 204, only the transaction commit operations corresponding to the transaction commit request need to be executed; or if the suspended transaction commit operations comprise transaction commit operations that have begun to be executed and transaction commit operations that are ready to be executed in the primary database 200, the executing transaction commit operations comprises: executing all suspended transaction commit operations.

If there is no first threshold of the log difference, when the primary database 200 determines that the log difference between the primary database 200 and the secondary database 201 is less than or equal to the first threshold, the primary database 200 may directly respond to the transaction commit request and execute the transaction commit operations corresponding to the transaction commit request.

It should be understood that in the example embodiment of the present disclosure, a log delay parameter max_log_delay may be added to the primary database 200, and the first threshold in the example embodiment of the present disclosure is the parameter max_log_delay. As long as the delay between the primary database 200 and the secondary database 201 falls within max_log_delay, the primary database 200 and the secondary database 201 are in an asynchronous mode. If the delay falls beyond this range, the primary database 200 and the secondary database 201 are in a synchronous mode. In this way, neither network jitter nor temporary blocking of the secondary database 201 affects the response of the primary database 200. In addition, once the primary database 200 is unavailable, switching is performed from the primary database 200 to the secondary database 201, and data loss is also strictly controlled within max_log_delay. The parameter max_log_delay may be set to, for example, 8 M by default.

Certainly, it should be understood that in this example embodiment, if the log difference is equal to the first threshold, the primary database 200 may also execute step 210 until the log difference is less than the first threshold. In this case, in step 212, the log difference between the primary database 200 and the secondary database 201 is less than the first threshold.

Figure 3:
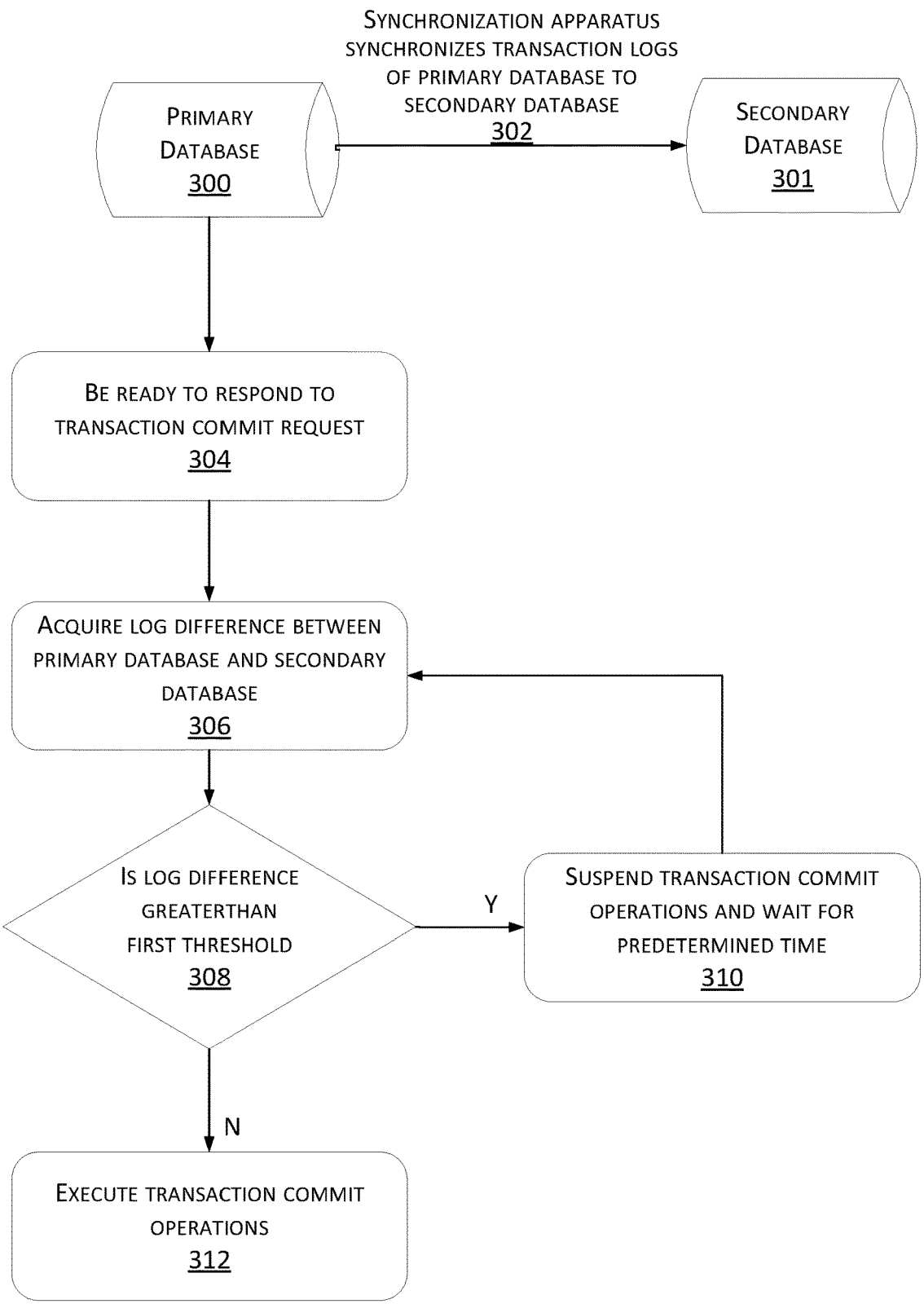
FIG. 3 is a flowchart of synchronization between a primary database and a secondary database according to an example embodiment of the present disclosure.

FIG. 3 is a flowchart of synchronization between a primary database 300 and a secondary database 301 according to an example embodiment of the present disclosure. The method in FIG. 3 may comprise the following steps.

302: A synchronization apparatus synchronizes transaction logs of a primary database 300 to a secondary database 301.

It should be understood that in the example embodiment of the present disclosure, the process of synchronizing the transaction logs of the primary database 300 to the secondary database 301 by the synchronization apparatus is a continuous process.

In this example embodiment, when synchronizing the transaction logs, the synchronization apparatus records, in the primary database 300, a point of the transaction logs that have been synchronized to the secondary database 301.

It should be understood that in this example embodiment, the synchronization apparatus may be a third-party apparatus other than the primary database 300 and the secondary database 301 or may be an apparatus located on the secondary database 301.

304: The primary database 300 is ready to respond to a transaction commit request.

306: The primary database 300 acquires a log difference between the primary database 300 and the secondary database 301.

308: The primary database 300 determines whether the log difference is greater than a first threshold.

If the log difference between the primary database 300 and the secondary database 301 is greater than the first threshold, step 310 is executed; or if the log difference between the primary database 300 and the secondary database 301 is less than or equal to the first threshold, step 312 is executed.

310: Suspend transaction commit operations and wait for a predetermined time.

For example, the primary database 300 suspends the transaction commit operations and executes step 306 after waiting for the predetermined time.

312: Execute transaction commit operations.

For example, the primary database 300 executes the transaction commit operations.

For example, implementation of the steps 304 to 312, refer to the steps 204 to 212 in FIG. 2. Details are omitted for simplicity in the example embodiment of the present disclosure.

It should be understood that FIG. 2 and FIG. 3 only show scenarios of how the primary database 300 determines a commit mode according to the log difference when committing a transaction. In example applications, the maintenance of a primary database 300 and secondary database 301 synchronization function may also be friendlier.

Figure 4:
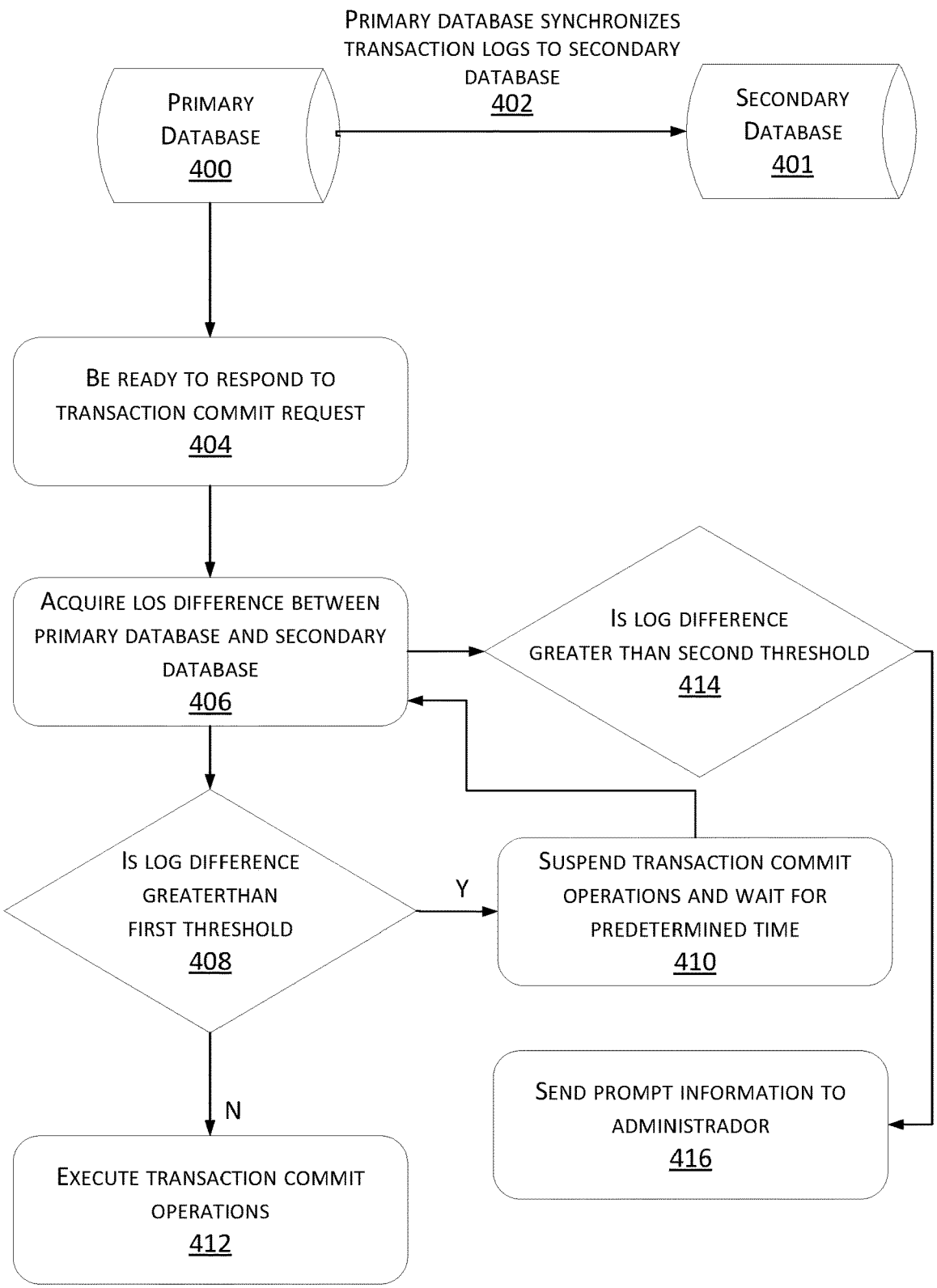
FIG. 4 is a flowchart of a primary database reminder according to an example embodiment of the present disclosure.

FIG. 4 is a flowchart of a primary database reminder according to an example embodiment of the present disclosure.

402: A primary database 400 synchronizes transaction logs to a secondary database 401.

404: The primary database 400 is ready to respond to a transaction commit request.

406: The primary database 400 acquires a log difference between the primary database 400 and the secondary database 401.

408: The primary database 400 determines whether the log difference is greater than a first threshold.

410: Suspend transaction commit operations and wait for a predetermined time.

412: Execute transaction commit operations.

For example, implementation of the steps 402 to 412, refer to the example embodiment shown in FIG. 2. Details are omitted for simplicity in the example embodiment of the present disclosure.

414: Determine whether the log difference is greater than a second threshold.

It should be understood that the way of determining whether the log difference is greater than the second threshold is similar to the way of determining whether the log difference is greater than the first threshold, and details are omitted for simplicity.

It should be understood that the second threshold may be the same as the first threshold, or greater than the first threshold, or less than the first threshold. For example, assuming that the first threshold is set to 10 M, the second threshold may be 10 M, 20 M, 8 M, or the like.

If the log difference is greater than the second threshold, step 416 is executed.

416: Send prompt information to an administrator.

It should be understood that in the example embodiment of the present disclosure, the administrator may be a person directly managing the primary database 400 or a person related to the function of managing the primary database 400.

It should be understood that in the example embodiment of the present disclosure, the primary database 400 may send the prompt information to inform the administrator of a synchronous status between the primary database 400 and the secondary database 401, so that the administrator may perform corresponding processing operations.

It should be understood that the primary database 400 may send the prompt information in a variety of ways. For example, an email may be sent to the administrator, an SMS message may be sent to the administrator's mobile phone, a voice call may be made to the administrator, or voice information and/or text information may be sent to the administrator's instant messaging tool.

In the example embodiment of the present disclosure, the prompt information is sent to the administrator in time to inform the administrator of the synchronization status between the primary database 400 and the secondary database 401, so that the administrator may maintain the primary database 400 and the secondary database 401 in time, thereby reducing the probability of failure occurrence to a certain extent or the loss of data when the failure occurs.

Figure 5:
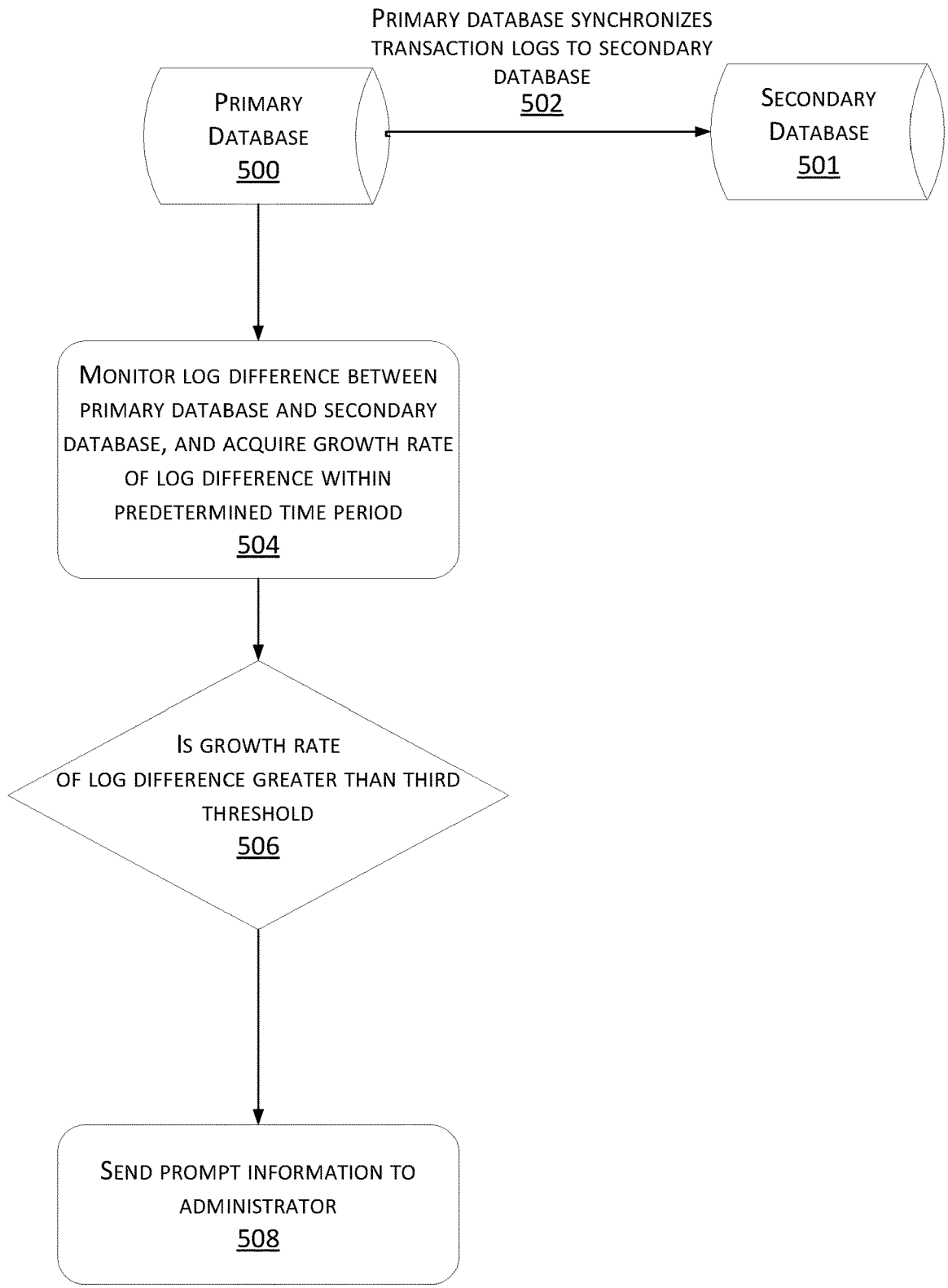
FIG. 5 is a flowchart of a primary database reminder according to another example embodiment of the present disclosure.

FIG. 5 is a flowchart of a primary database reminder according to another example embodiment of the present disclosure. The method in FIG. 5 comprises the following steps.

502: A primary database 500 synchronizes transaction logs to a secondary database 501.

For example, implementation of step 502, refer to step 202 in FIG. 2.

504: The primary database 500 monitors a log difference between the primary database 500 and the secondary database 501 and acquires a growth rate of the log difference within a predetermined time period.

For example, for example, the primary database 500 may periodically acquire the log difference between the primary database 500 and the secondary database 501, and then obtain the growth rate of the log difference over a period of time based on log differences acquired from at least two time points.

506: Determine whether the growth rate of the log difference is greater than a third threshold.

After obtaining the growth rate of the log difference within the predetermined time period, the primary database 500 may determine whether the growth rate of the log difference is greater than the third threshold.

If no, return.

If yes, an error might have occurred in the secondary database 501. In this case, step 508 may be executed.

508: Send prompt information to an administrator.

For example, implementation of step 508, refer to step 416 in FIG. 4.

Certainly, it should be understood that the prompt information sent in step 508 may be the same as or different from the prompt information sent in step 416.

Example embodiments of the present disclosure have been described above. Other example embodiments fall within the scope of the appended claims. In some cases, actions or steps recited in the claims may be executed in an order different from that in the example embodiment and desired results may still be achieved. In addition, the processes described in the accompanying drawings do not necessarily require the specific order or sequential order shown to achieve the desired results. In some implementations, multi-tasking and parallel processing are also possible or may be beneficial.

Figure 6:
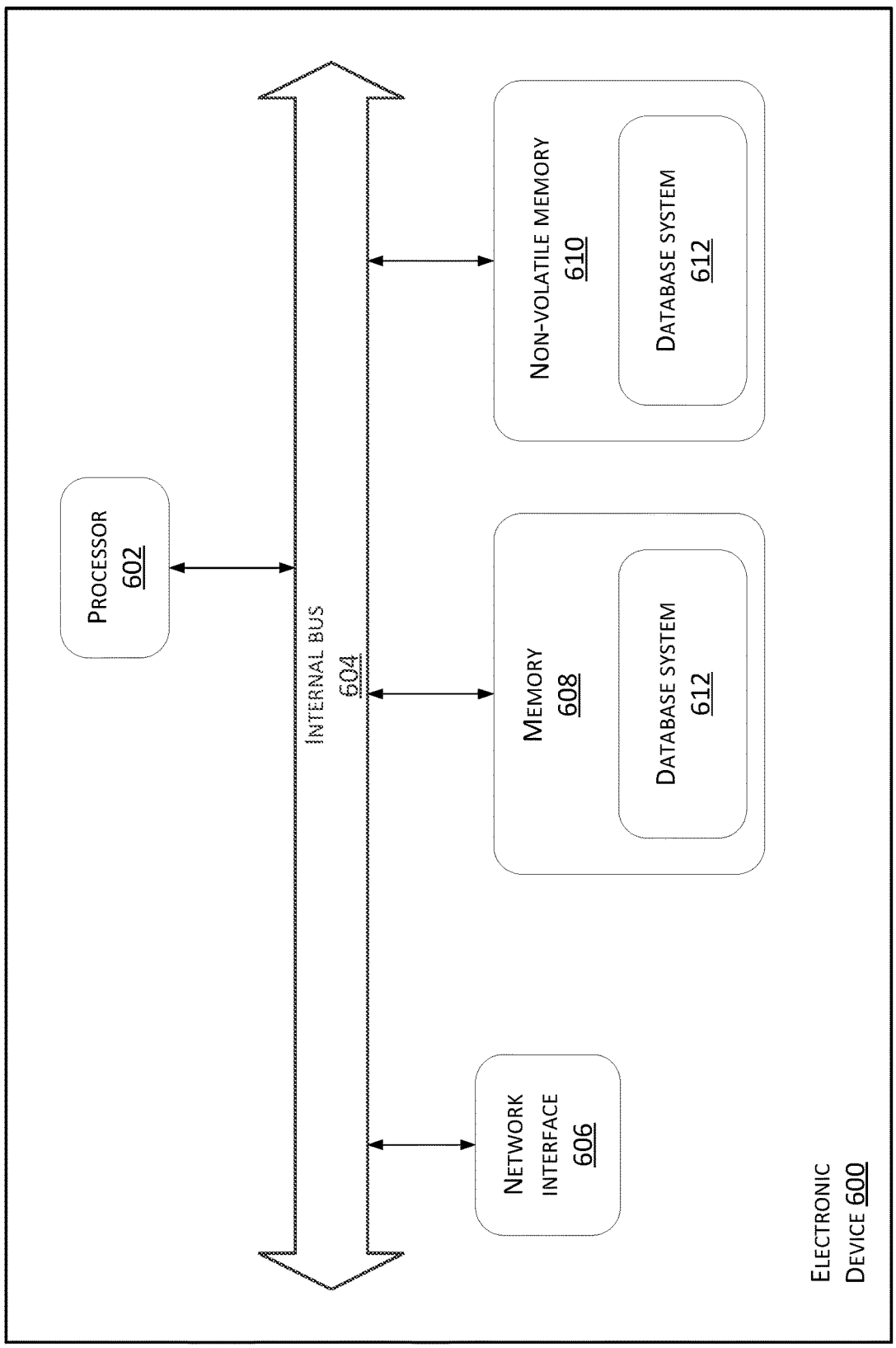
FIG. 6 is a schematic structural diagram of an electronic device according to an example embodiment of the present disclosure.

FIG. 6 is a schematic structural diagram of an electronic device 600 according to an example embodiment of the present disclosure. Referring to FIG. 6, at the hardware level, the electronic device 600 comprises a processor 602, and further comprises an internal bus 604, a network interface 606, a memory 608, and a non-volatile memory 610. The memory 608 may comprise an internal memory, such as a high-speed Random-Access Memory (RAM), and may also comprise a non-volatile memory, such as at least one disk memory. Certainly, the electronic device may also comprise hardware required for other services.

The processor 602, the network interface 606, and the memory 608 may be connected to each other through the internal bus 604, which may be an Industry Standard Architecture (ISA) bus, a Peripheral Component Interconnect (PCI) bus, an Extended Industry Standard Architecture (EISA) bus, or the like. The buses may fall into an address bus, a data bus, a control bus, and the like. For ease of representation, only one double-headed arrow is used for representation in FIG. 6, but it does not mean only one bus, or one type of bus is present.

The memory 608 and the non-volatile memory 610 are configured to store programs. For example, the programs may comprise program code, and the program code comprises computer readable instructions. Both the memory 608 and the non-volatile memory 610 are examples of computer readable media.

The processor 602 reads a corresponding computer program from the non-volatile memory 610 into the memory 608, and then runs the computer program to form a database system 612. The processor 602 executes the programs stored in the memory 608 and is, for example, configured to execute the following operations:

acquiring, in response to a transaction commit request, a log difference between a transaction log of a primary database and a transaction log that has been synchronized to a secondary database in the electronic device;

suspending transaction commit operations if the log difference is greater than a first threshold; and executing the transaction commit operations if the log difference is less than or equal to the first threshold.

The method executed by the primary database as disclosed in the example embodiments shown in FIG. 1 to FIG. 5 of the present disclosure may be applied to or implemented by the processor 602. The processor 602 may be an integrated circuit chip with a signal processing capability. In the implementation process, each step of the above method may be completed by an integrated logic circuit of hardware in the processor or instructions in the form of software. The foregoing processor may be a general-purpose processor, which comprises a Central Processing Unit (CPU), a Network Processor (NP), or the like; or may be a Digital Signal Processor (DSP), an Application Specific Integrated Circuit (ASIC), a Field-Programmable Gate Array (FPGA) or another programmable logic device, a discrete gate or a transistor logic device, or a discrete hardware component. The disclosed methods, steps and logical block diagrams in the example embodiments of the present disclosure may be implemented or executed. The general-purpose processor may be a microprocessor or any conventional processor or the like. The steps of the method disclosed with reference to the example embodiments of the present disclosure may be directly executed by a hardware decoding processor or by a combination of hardware and software modules in a decoding processor. The software module may be located in a storage medium mature in the art, such as a RAM, a flash memory, a read-only memory, a programmable read-only memory or an electrically erasable programmable memory, or a register. The storage medium is located in the memory, and the processor reads information in the memory and completes the steps of the above method by combining its hardware.

The electronic device 600 may also implement the method in FIG. 1 and realize the functions of the primary database in the example embodiments shown in FIG. 1 to FIG. 5. Details are omitted for simplicity in the example embodiment of the present disclosure.

Certainly, other than software implementations, the electronic device 600 of the present disclosure does not exclude other implementations, such as a logic device or a combination of software and hardware. In other words, an execution body of the following processing procedure is not limited to each logic unit, as it might also be hardware or logic devices.

An example embodiment of the present disclosure further provides a computer readable storage medium storing one or more programs including instructions. The instructions are executed by a portable electronic device including a plurality of applications so that the portable electronic device implements the method in the example embodiment shown in FIG. 1.

FIG. 7 is a schematic structural diagram of a database system 612 according to an example embodiment of the present disclosure. Referring to FIG. 7, in a software implementation, the database system 612 may comprise an acquisition unit(s) 710, a suspension unit 720, and an execution unit 730;

the acquisition unit 710 acquires, in response to a transaction commit request, a log difference between transaction logs of the database system 612 and transaction logs that have been synchronized to a secondary database;

the suspension unit 720 suspends transaction commit operations if the log difference is greater than a first threshold; and the execution unit 730 executes the transaction commit operations if the log difference is less than or equal to the first threshold.

It should be understood that in the example embodiment of the present disclosure, the secondary database is a backup database of the database system 612.

In the example embodiment of the present disclosure, the database system 612 determines, in response to the transaction commit request, whether to suspend the transaction commit operations or execute the transaction commit operations according to the log difference between the database system 612 and the secondary database, so that the database system 612 may stay responsive and loss of a large amount of data may be prevented when the database system 612 is unavailable, improving the performance of the database system to a certain extent.

For example, the execution unit 730 further writes transaction logs for executing the transaction commit operations into the transaction logs of the database system 612.

For example, in an example embodiment, the suspension unit 720 suspends transaction commit operations corresponding to the transaction commit request if the log difference is greater than the first threshold; and the execution unit 730 executes the transaction commit operations corresponding to the transaction commit request if the log difference is less than or equal to the first threshold.

For example, in another example embodiment, the suspension unit 720 suspends transaction commit operations that have begun to be executed and transaction commit operations that are ready to be executed in the primary database.

Further, the execution unit 730 executes the suspended transaction commit operations if the log difference is less than or equal to the first threshold.

Alternatively, further, the execution unit 730 executes the transaction commit operations corresponding to the transaction commit request if the log difference is less than or equal to the first threshold, and when there is no suspended transaction commit operation.

For example, in an example embodiment, the acquisition unit 710 is configured to: acquire a latest written log point in the database system; acquire a latest sent log point in the database system; and determine the log difference based on the latest log point and the sent log point.

Further, the database system records point information of sent logs transmitted to the secondary database.

For example, the database system 612 further comprises a first prompting unit 740, configured to send first prompt information to an administrator when the log difference is greater than a second threshold. Further, the first threshold is the same as the second threshold; or the first threshold is different from the second threshold.

For example, the database system 612 further comprises a second prompting unit 750, where the acquisition unit 710 further acquires, within a predetermined time, a growth rate of the log difference between the transaction logs of the database system 612 and the transaction logs that have been synchronized to the secondary database; and if the growth rate is greater than a third threshold, the second prompting unit 750 sends second prompt information to the administrator.

For example, in an example embodiment, the database system 612 further comprises a synchronization unit 760 that synchronizes the transaction logs of the database system 612 to the secondary database.

For example, in another example embodiment, the transaction logs of the database system 612 are synchronized to the secondary database by a third-party apparatus.

For example, in another example embodiment, the transaction logs of the database system 612 are actively synchronized to the secondary database by the secondary database.

The database system 612 may also execute the method executed by the primary database in the example embodiments shown in FIG. 1 to FIG. 5. For example, implementation, refer to the example embodiments shown in FIG. 1 to FIG. 5. Details are omitted for simplicity in the example embodiment of the present disclosure.

In summary, the above descriptions are only example embodiments of the present disclosure and are not intended to limit the protection scope of the present disclosure. Any modification, equivalent substitution, improvement, and the like made within the spirit and principle of the present disclosure should fall within the protection scope of the present disclosure.

The systems, apparatuses, modules or units illustrated in the above example embodiments may be implemented by computer chips or entities, or by products with certain functions. A typical implementation device is a computer. For example, the computer may be, for example, a personal computer, a laptop computer, a cellular phone, a camera phone, a smartphone, a personal digital assistant, a media player, a navigation device, an email device, a game console, a tablet computer, a wearable device, or a combination thereof.

Computer readable media comprise permanent and non-permanent as well as removable and non-removable media. Information may be stored by any method or technology.

The information may be computer readable instructions, data structures, modules of programs, or other data. Examples of storage media of the computer comprise but are not limited to a phase change RAM (PRAM), a static RAM (SRAM), a dynamic RAM (DRAM), other types of RAMs, a read-only memory (ROM), an electrically erasable programmable ROM (EEPROM), a flash memory or other memory technologies, a compact disc ROM (CD-ROM), a digital versatile disk (DVD) or other optical storage, magnetic cassettes, magnetic tape magnetic disk storage or other magnetic storage devices or any other non-transmission medium, which may be used to store information accessible by computing devices. As defined herein, computer readable media do not comprise transitory media, such as modulated data signals and carriers.

It should also be noted that the term "comprise", "include", or any other variant thereof is intended to encompass a non-exclusive inclusion, so that a process, method, product, or device that involves a series of elements comprises not only those elements, but also other elements not explicitly listed, or elements that are inherent to such a process, method, product, or device. Without more restrictions, an element defined by the phrase "including a . . . " does not exclude the presence of another same element in a process, method, product, or device that comprises the element.

Each example embodiment of the present disclosure is described in a progressive manner. For same or similar parts in the example embodiments, refer to each other. Each example embodiment focuses on differences from other example embodiments. In particular, since the system example embodiment is basically similar to the method example embodiment, the description is relatively simple. For relevant parts, refer to part of the description of the method example embodiment.

The present disclosure may further be understood with clauses as follows.

Clause 1. A method for synchronization between a primary database and a secondary database, the method comprising:

acquiring, in response to a transaction commit request, a log difference between a transaction log of a primary database and a transaction log that has been synchronized to a secondary database;

suspending transaction commit operations if the log difference is greater than a first threshold; and executing the transaction commit operations if the log difference is less than or equal to the first threshold.

Clause 2. The method according to clause 1, wherein the suspending the transaction commit operations comprises suspending the transaction commit operations corresponding to the transaction commit request; and the executing the transaction commit operations comprises executing the transaction commit operations corresponding to the transaction commit request.

Clause 3. The method according to clause 1, wherein the suspending the transaction commit operations comprises suspending a transaction commit operation already in progress and a transaction commit operation that is ready to be executed in the primary database.

Clause 4. The method according to clause 1 or 3, wherein the executing the transaction commit operations comprises:

executing the suspended transaction commit operations; or when there are no suspended transaction commit operations, executing the transaction commit operations corresponding to the transaction commit request.

Clause 5. The method according to any one of clauses 1 to 3, further comprising:

writing a transaction log for executing the transaction commit operation into the transaction log of the primary database.

Clause 6. The method according to any one of clauses 1 to 3, wherein the acquiring the log difference between the transaction log of the primary database and the transaction logs of the secondary database comprises:

acquiring a latest log written point in the primary database;

acquiring a latest log sent point in the primary database; and determining the log difference based on the latest log point and the latest log sent point.

Clause 7. The method according to clause 6, wherein the primary database records points of sent logs transmitted to the secondary database.

Clause 8. The method according to any one of clauses 1 to 3, wherein when the log difference is greater than a second threshold, the method further comprises:

sending first prompt information to an administrator.

Clause 9. The method according to any one of clauses 1 to 3, further comprising:

monitoring, within a predetermined time, an increasing rate of the log difference between the transaction log of the primary database and the transaction log that has been synchronized to the secondary database; and if the increasing rate is greater than a third threshold, sending second prompt information to the administrator.

Clause 10. The method according to any one of clauses 1 to 3, wherein the transaction log of the primary database is synchronized to the secondary database by the primary database;

the transaction log of the primary database is synchronized to the secondary database by a third-party apparatus; or the transaction log of the primary database is actively synchronized to the secondary database by the secondary database.

Clause 11. A database system comprising:

an acquisition unit configured to acquire, in response to a transaction commit request, a log difference between a transaction log of the database system and a transaction log that has been synchronized to a secondary database;

a suspension unit configured to suspend a transaction commit operation if the log difference is greater than a first threshold; and an execution unit configured to execute the suspended transaction commit operation if the log difference is less than or equal to the first threshold.

Clause 12. An electronic device, comprising:

one or more processors; and one or more memories storing computer readable instructions that, executable by the one or more processors, cause the one or more processors to perform acts comprising:

acquiring, in response to a transaction commit request, a log difference between a transaction log of a primary database in the electronic device and a transaction log that has been synchronized to a secondary database;

suspending a transaction commit operation if the log difference is greater than a first threshold; and executing the suspended transaction commit operation if the log difference is less than or equal to the first threshold.

Clause 13. A computer readable storage medium storing therein one or more programs that, executable by an electronic device comprising a plurality of applications, cause the electronic device to perform acts comprising:
acquiring, in response to a transaction commit request, a log difference between a transaction log of a primary database and a transaction log that has been synchronized to a secondary database in the electronic device;
suspending a transaction commit operation if the log difference is greater than a first threshold; and
executing the suspended transaction commit operations if the log difference is less than or equal to the first threshold.

What is claimed is:

1. A method comprising:
acquiring a log difference between a transaction log of a primary database and a transaction log that has been synchronized from the primary database to a secondary database;
determining that the log difference is greater than a first threshold; and
in response to determining that the log difference is greater than the first threshold, suspending one or more transaction commit operations at the primary database.

2. The method of claim 1, wherein the acquiring the log difference between the transaction log of the primary database and the transaction log that has been synchronized to the secondary database comprises:
acquiring, in response to a transaction commit request, the log difference between the transaction log of the primary database and the transaction log that has been synchronized to the secondary database.

3. The method of claim 2, wherein the suspending the one or more transaction commit operations comprises suspending a transaction commit operation corresponding to the transaction commit request.

4. The method of claim 1, wherein the suspending the one or more transaction commit operations comprises suspending a transaction commit operation already in progress and a transaction commit operation that is ready to be executed in the primary database.

5. The method of claim 1, wherein the acquiring the log difference between the transaction log of the primary database and the transaction logs of the secondary database comprises:
acquiring a latest log written point in the primary database;
acquiring a latest log sent point in the primary database; and
determining the log difference based on the latest log written point and the latest log sent point.

6. The method of claim 5, wherein
the primary database records points of sent logs transmitted to the secondary database.

7. The method of claim 1, further comprising:
determining that the log difference is greater than a second threshold; and
sending first prompt information to an administrator.

8. The method of claim 7, further comprising:
monitoring, within a predetermined time, an increasing rate of the log difference between the transaction log of the primary database and the transaction log that has been synchronized to the secondary database;
determining that the increasing rate is greater than a third threshold; and
sending second prompt information to the administrator.

9. The method of claim 1, wherein the transaction log of the primary database is synchronized to the secondary database by the primary database.

10. The method of claim 1, wherein the transaction log of the primary database is synchronized to the secondary database by a third-party apparatus.

11. The method of claim 1, wherein the transaction log of the primary database is actively synchronized to the secondary database by the secondary database.

12. An electronic device comprising:
one or more processors; and
one or more computer readable media storing computer readable instructions that, executable by the one or more processors, cause the one or more processors to perform acts comprising:
acquiring, in response to a transaction commit request, a log difference between a transaction log of a primary database and a transaction log that has been synchronized from the primary database to a secondary database;
determining that the log difference is less than or equal to a first threshold; and
in response to determining that the log difference is less than or equal to the first threshold, executing a transaction commit operation at the primary database.

13. The electronic device of claim 12, wherein the executing the transaction commit operation comprises executing the transaction commit operation corresponding to the transaction commit request.

14. The electronic device of claim 12, wherein the acts further comprise:
writing a transaction log for executing the transaction commit operation into the transaction log of the primary database.

15. The electronic device of claim 12, wherein the acquiring the log difference between the transaction log of the primary database and the transaction logs of the secondary database comprises:
acquiring a latest log written point in the primary database;
acquiring a latest log sent point in the primary database; and
determining the log difference based on the latest log point and the latest log sent point.

16. The electronic device of claim 15, wherein:
the transaction log of the primary database is synchronized to the secondary database by the primary database; or
the transaction log of the primary database is synchronized to the secondary database by a third-party apparatus; or
the transaction log of the primary database is actively synchronized to the secondary database by the secondary database.

17. One or more computer readable media storing computer readable instructions that, executable by one or more processors, cause the one or more processors to perform acts comprising:
acquiring, in response to a transaction commit request, a log difference between a transaction log of a primary database and a transaction log that has been synchronized from the primary database to a secondary database;
suspending a transaction commit operation in response to determining that the log difference is greater than a first threshold; and executing the transaction commit operation in response to determining that the log difference is less than or equal to the first threshold.

18. The one or more computer readable media of claim 17, wherein
the suspending the transaction commit operation comprises suspending the transaction commit operations corresponding to the transaction commit request; and
the executing the transaction commit operation comprises executing the transaction commit operations corresponding to the transaction commit request.

19. The one or more computer readable media of claim 17, wherein the executing the transaction commit operation comprises:
executing a previously suspended transaction commit operation; or
in response to determining that there is no suspended transaction commit operation, executing the transaction commit operation corresponding to the transaction commit request.

20. The one or more computer readable media of claim 17, wherein the acquiring the log difference between the transaction log of the primary database and the transaction logs of the secondary database comprises:
acquiring a latest log written point in the primary database;
acquiring a latest log sent point in the primary database; and
determining the log difference based on the latest log point and the latest log sent point.

* * * * *